US006214074B1

(12) United States Patent
Silviera et al.

(10) Patent No.: US 6,214,074 B1
(45) Date of Patent: Apr. 10, 2001

(54) ODOR/AIR PURIFIER MOUNTABLE UNDER A KITCHEN CABINET

(75) Inventors: Rick Silviera, New Bedford; Anatoly Ratsimor, Brighton; Johnson Hsu, Framingham, all of MA (US); Robert Sherwood, El Paso, TX (US)

(73) Assignee: The Holmes Group, Inc., Milford, MA (US)

( * ) Notice: Subject to any disclaimer, the term of this patent is extended or adjusted under 35 U.S.C. 154(b) by 0 days.

(21) Appl. No.: 09/225,412

(22) Filed: Jan. 5, 1999

(51) Int. Cl.[7] ............................... B01D 50/00; H02P 7/00
(52) U.S. Cl. .................. 55/385.4; 55/471; 55/DIG. 36; 248/670; 248/316.8; 388/838
(58) Field of Search .................. 55/385.4, 471, 55/385.1, DIG. 36, 438, 439; 388/803, 808, 806, 827, 838, 840; 248/670, 674, 316.8, 317

(56) References Cited

U.S. PATENT DOCUMENTS

| | | |
|---|---|---|
| 3,075,335 | 1/1963 | Bandlow . |
| 3,167,145 * | 1/1965 | Mackle . |
| 3,873,285 * | 3/1975 | Allen . |
| 4,030,008 * | 6/1977 | Buckle et al. . |
| 4,133,300 * | 1/1979 | Burton, Jr. et al . . |
| 4,292,574 * | 9/1981 | Sipin et al. . |
| 4,313,043 * | 1/1982 | White et al. . |
| 4,411,675 | 10/1983 | de Castella . |
| 4,450,756 | 5/1984 | Kling . |
| 4,526,592 | 7/1985 | Armbruster . |
| 4,625,633 | 12/1986 | Martin . |
| 4,639,657 * | 1/1987 | Frierdich . |
| 4,666,113 * | 5/1987 | Itoh et al. . |
| 4,726,823 * | 2/1988 | Brice . |
| 4,762,463 * | 8/1988 | Yang . |
| 4,816,973 | 3/1989 | Atalla et al. . |
| 4,849,862 | 7/1989 | Diskin et al. . |
| 4,893,067 * | 1/1990 | Bhagwat et al. . |
| 5,089,938 * | 2/1992 | White et al. . |
| 5,131,932 * | 7/1992 | Glucksman . |
| 5,167,681 | 12/1992 | O'Keefe et al. . |
| 5,226,719 | 7/1993 | Feldpausch et al. . |
| 5,347,205 * | 9/1994 | Piland . |
| 5,348,563 | 9/1994 | Davis . |
| 5,655,055 | 8/1997 | Goldstein et al. . |
| 5,803,940 * | 9/1998 | Rick et al. . |
| 5,841,358 * | 11/1998 | Jamieson . |
| 5,925,245 * | 7/1999 | Bradford . |
| 6,033,301 * | 3/2000 | Suwa . |

* cited by examiner

Primary Examiner—David A. Simmons
Assistant Examiner—Fred Prince
(74) Attorney, Agent, or Firm—Hoffmann & Baron, LLP; Francis E. Marino

(57) ABSTRACT

An air purifier unit having a mounting assembly that allows the mounting of the unit underneath a cabinet or on any like flat surface. A cartridge filter is provided and easily ejected or replaced through a filter door in the face of the enclosure. A motor speed indicator circuit enables the user to visually monitor the speed of the motor and blower. Air is drawn into the housing of the unit through an intake opening on the bottom surface of the housing, forced through a cartridge filter, and expelled out an air exhaust opening.

21 Claims, 8 Drawing Sheets

ODOR/AIR PURIFIER MOUNTABLE UNDER A KITCHEN CABINET

BACKGROUND OF THE INVENTION

1. Field of the Invention

The present invention relates to an air purifier. More particularly, the present invention relates to an air purification device removably mountable under a kitchen cabinet or similar surface and having an ejectable filter mechanism for easy removal of the filter; and control circuitry to indicate variable blower speed.

2. Description of the Prior Art

Air purifiers are well known. Generally they include, within a housing, a motor that turns a blower that either draws or forces air through some filtration material, and may redirect the flow of air about the room.

However, it is usually the case that due to the construction of these devices, the filtration material is either inaccessible or difficult to access, requiring the user to open the housing to replace the filter, or to very deliberately withdraw the filter from within the housing.

The present invention overcomes the disadvantages of known air filters by providing an air purification unit with a simple, push button access to the filter, substantially ejecting the filter from it's housing.

In addition, known air purifiers are designed to be placed in a variety of locations, including free standing floor units, ceiling mounted, or wall receptacle mounted designs. Commonly, such units are mounted above a recessed ceiling. Consequently, the prior art air purifiers either require difficult and inaccessible permanent ceiling mounting, or space consuming placement on the floor, table or wall. The present invention overcomes the disadvantages discussed above by providing an air purifier with a mounting system that not only allows the unit to be placed under a cabinet, or any like flat surface, but also to be easily removed and/or replaced, without having to dismantle the unit's mounting.

Furthermore, the known air purifiers do not provide a visual speed indicator to allow the user to monitor blower speed. The present invention overcomes this disadvantage by providing an LED motor speed indicator and accompanying circuit to permit the user to monitor motor speed.

SUMMARY OF THE INVENTION

An air purifier which is removably mountable under a cabinet, or like surface, which employs an ejectable cartridge-type filter and which provides visual indication of the blower speed, constructed according to the present invention comprises a housing, including a housing base and a housing top cover. The housing encloses a motor, mounted on a blower frame which is axially connected to a circular blower. The blower draws air, vertically, through an air intake opening in the base, a cartridge-type filter, the motor frame, and discharges the purified air in a horizontal direction through an air exhaust opening in the housing top cover. The housing top cover is removably secured to a mounting bracket which may be positioned on a bottom surface of a cabinet. The mounting bracket lockingly engages along the outer edges of the housing top cover and includes a releasable mounting latch to unlock the mounting mechanism. In the preferred embodiment the filter can be ejected, through a filter door in the housing top cover, for removal and replacement. In order to eject the filter, the air purifier includes a filter ejection assembly, which is selectively operated by a push button switch located on the exterior of the housing. A motor speed indicator circuit provides a visual indication, via a plaurality of LED's, of the speed of the motor driven blower.

These and other advantages of the invention will be further understood and appreciated by those skilled in the art by reference to the following written description, claims and appended drawings.

DETAILED DESCRIPTION OF THE PREFERRED EMBODIMENT

Figure 1:
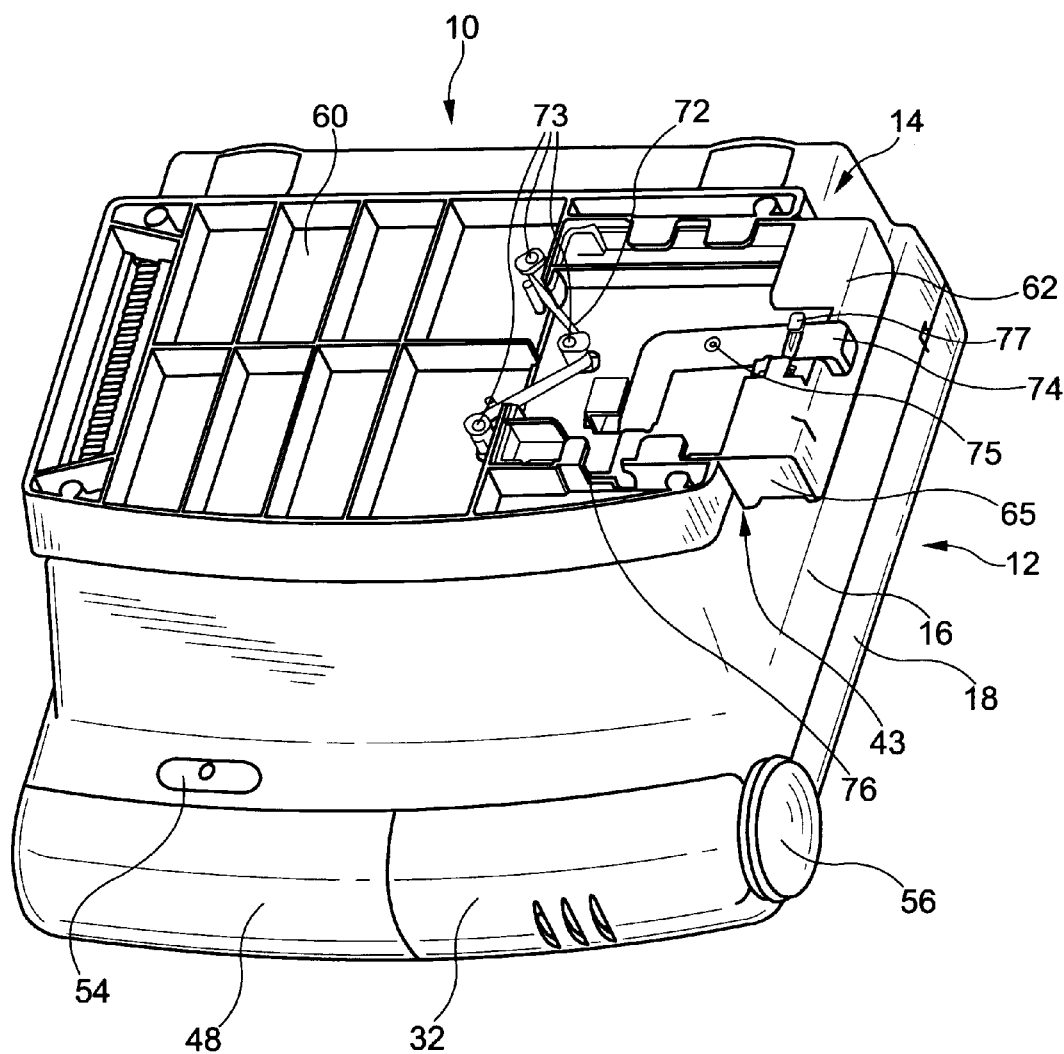
FIG. 1 is a top perspective view of the air purifier of the present invention including a view of the mounting bracket.

Referring to FIG. 1, the present invention comprises an air purifier 10 having a housing 12 secured to a mounting bracket assembly 14.

Figure 2:
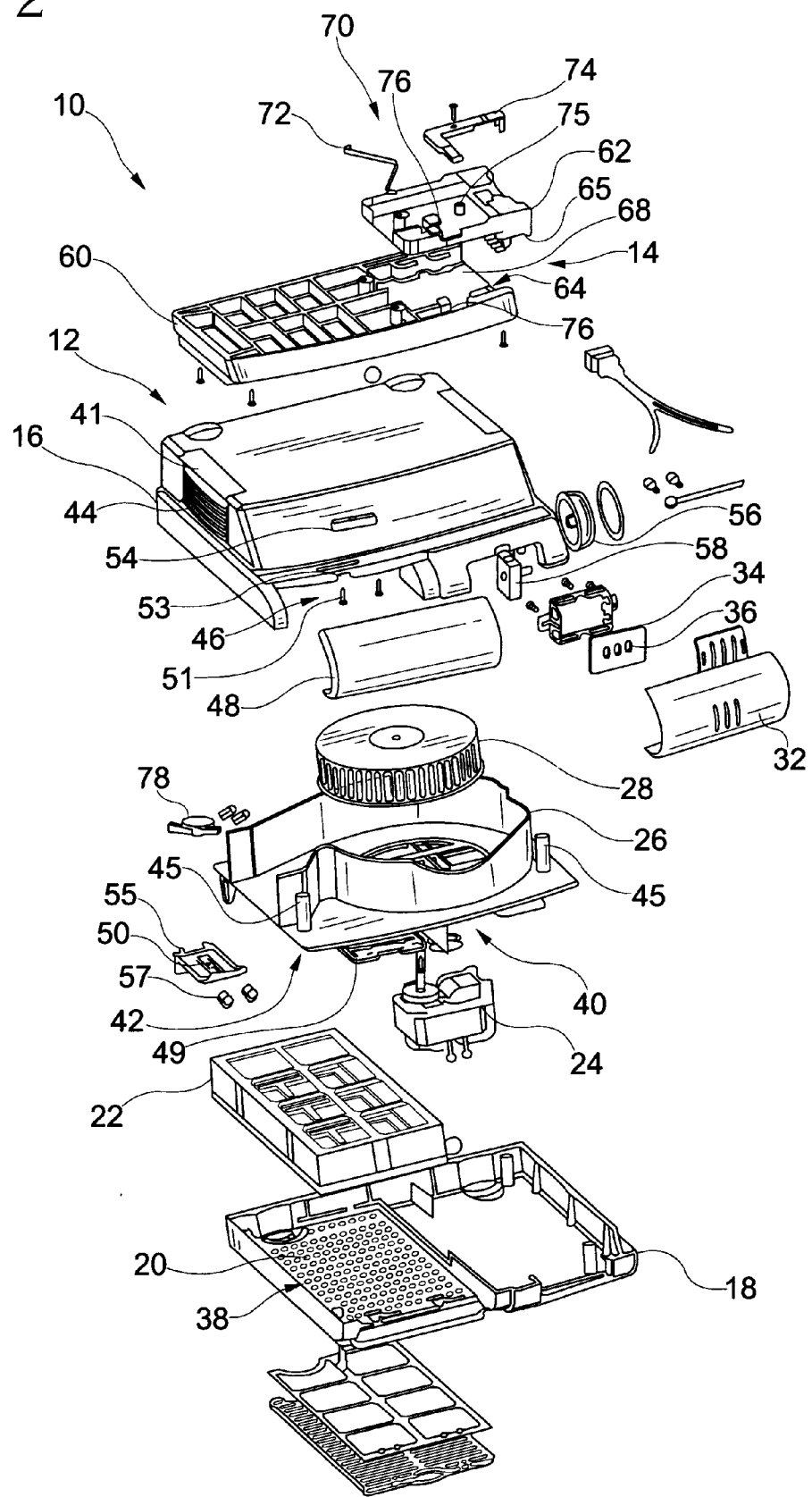
FIG. 2 is an exploded perspective view of the air purifier of the present invention.

Referring to FIG. 2, housing 12 is comprised of housing top cover 16 and a housing base 18. Housing 12 is dimensioned to enclose an air intake grill 20, cartridge filter 22, blower frame 26; including mounted thereto a fan blade 28 and motor 24; motor control circuitry shown in FIG. 4; filter ejection mechanism; control panel 32, which houses printed circuit board 34, and motor speed indicating circuitry 36.

Housing base 18 includes an air intake grill 20 which comprises an air intake opening 38. Blower frame 26 includes at least two downwardly extending vertical wall sections, defining a motor mounting space 40. A cartridge receiving space 42 is provided between the blower frame 26 and housing base 18 for housing the cartridge filter 22. Motor 24 is mounted to the blower frame 26 and is connected to the fan blade 28 via a motor shaft extending axially through an opening in blower frame 26. The fan blade 28 is preferably a squirrel cage type of blower arrangement.

Housing top cover 16 includes a series of horizontal slots in a sidewall thereof forming an air exhaust opening 44 and is securable to housing base 18 through a plurality of mounting holes 45 in motor frame 26. Blower frame 26 includes an upwardly extending vertical wall which defines an air directing structure dimensioned to substantially surround fan blade 28, except for a portion adjacent to and cooperating with the exhaust opening 44, thereby forming an air duct for directing purified air therethrough. Housing top cover 16 also includes a first mounting slot 45 and a second mounting slot 47, described below, for mounting housing 12 to the mounting bracket 60.

Figure 7:
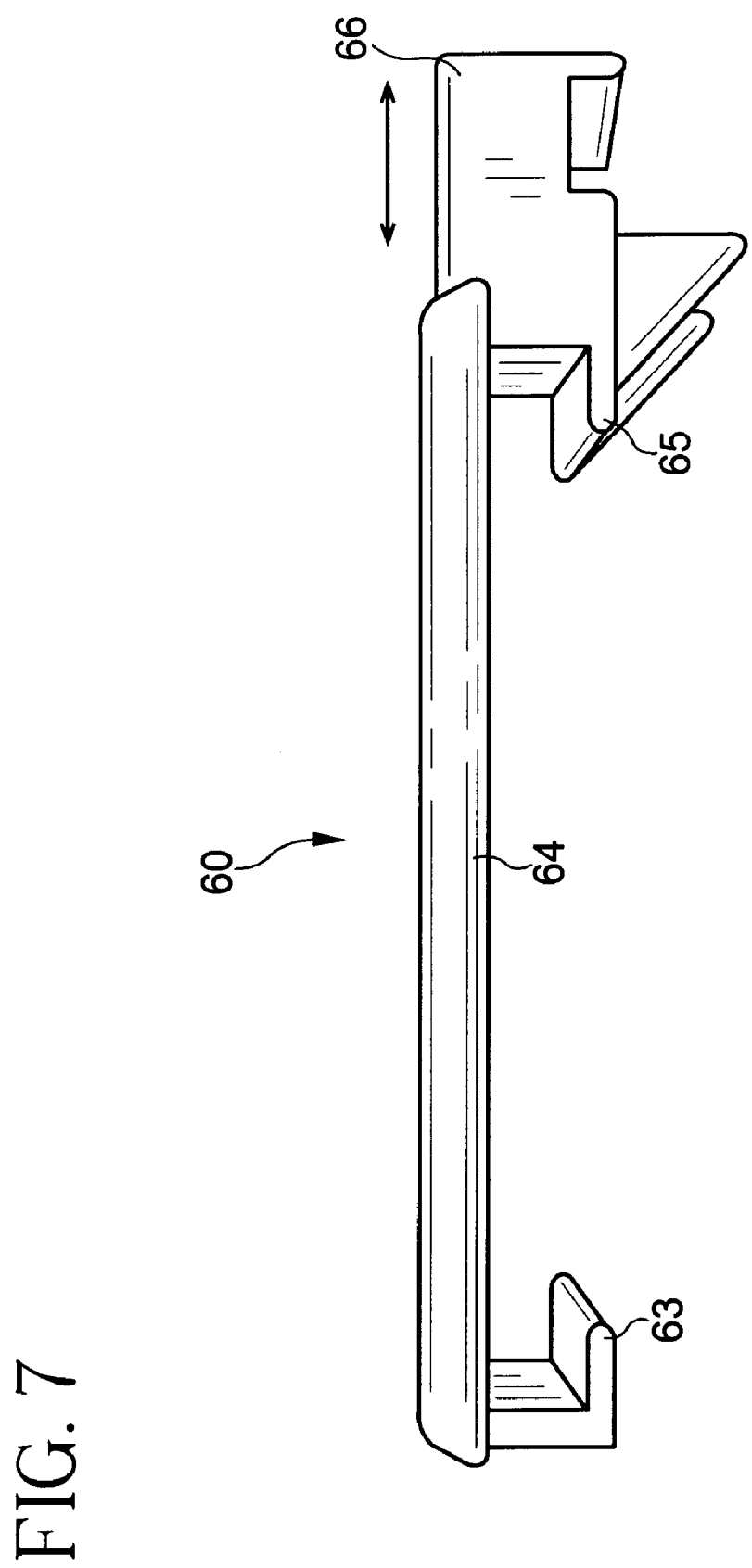
FIG. 7 is a front view of the mounting bracket, including the first and second cooperative coupling mechanisms.

First mounting slot 41 is defined by a horizontal slot, located directly above exhaust opening 44, dimensioned to receive a first mounting tab which extends downwardly from a bottom surface of the mounting bracket 60, as described below. Second mounting slot 43 is defined by a horizontal slot in housing top cover 16, opposite exhaust opening 44. Second mounting slot 43 also has at least one vertical slot portion, as shown in FIG. 7, extending downward from the horizontal slot portion. Second mounting slot 43 is dimensioned to receive a second mounting tab 65 which extends downwardly from a bottom surface of the mounting bracket 60, the second mounting tab 65 being slideable relative to the bracket for releaseably gripping the air purifier.

Filter 22 is preferably a cartridge-type filter, including filter elements which are capable of removing both smoke particles and odor from the air. Since the air purifier is particularly suited for placement under a kitchen cabinet, it is beneficial to use a filter assembly which includes odor removing media to absorb kitchen odors. In order to accomadate the filter, the housing top cover 16 includes a receiving space opening 46 and a door 48, both dimensioned to permit the filter 22 to be inserted into a cartridge receiving space 42. The filter cartridge is positioned within the receiving space such that substantially all the air drawn into the air purifier 10 passes through the filter 22 before being exhausted. The filter 22 is selectively positioned within, and ejected or removable from the filter receiving space 42 by a filter ejection mechanism which is described below.

Figure 5:
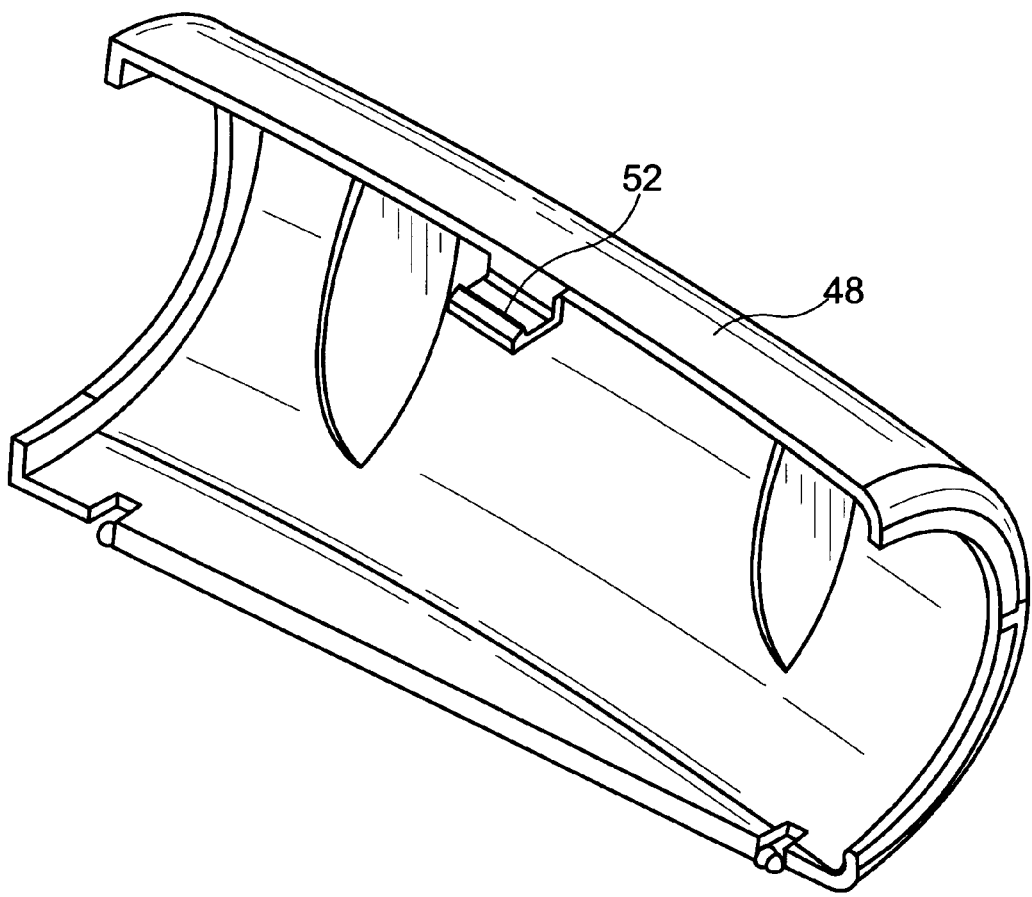
FIG. 5 is a rear elevational view of the filter door of the present invention, including a view of the door opening latch.
Figure 6:
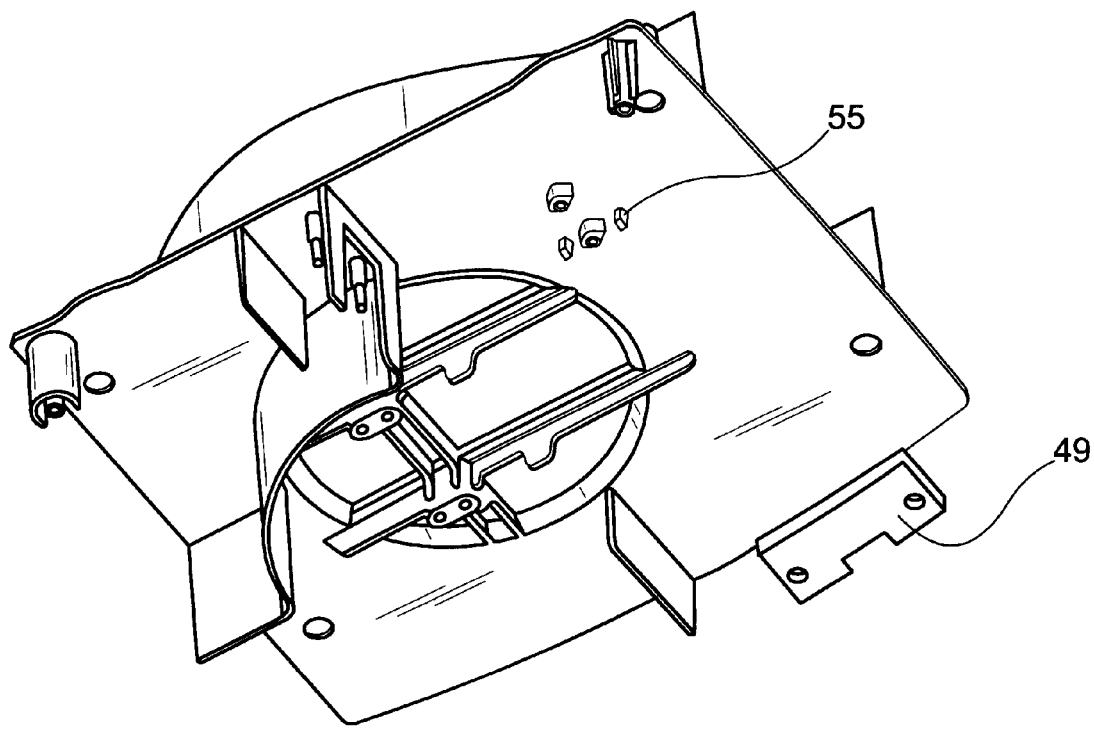
FIG. 6 is a bottom perspective view of the blower frame including a view of ejector button mounting plate and ejector spring tabs.

As illustrated in FIGS. 2 and 5, the filter ejection mechanism comprises a spring loaded ejector latch 50 and door opening latch 52, cooperatively coupled to an ejector button 54 positioned on an outer surface of the housing 12. Door opening latch 52 is comprised of a shallow U-shaped extension as shown in FIG. 5, integrally formed in the top edge of door 48. Door opening latch 52 engages a bottom edge of ejector button 54 through a notch 53 formed directly anterior to the ejector button 54, and immediately above the receiving space opening 46, in the front face of housing top cover 16. Ejector button 54 is mounted on an ejector button mounting plate 49, the ejector button mounting plate 49 being secured to the blower frame 26 by conventional means. Ejector button 54 is biased against the underside of housing top cover 16 by ejector button springs 51 which are placed between the ejector button 54 and the ejector button mounting plate 49. Ejector latch 50 comprises a generally L-shaped, spring loaded, bracket that cooperatively engages the filter 22. Ejector latch 50 is slidably mounted on the underside of the blower frame 26 by two fasteners, such as screws. Ejector latch springs 57 are mounted on ejector spring tabs 55 on both the underside of the blower frame 26, as in FIG. 6 and on the ejector latch 50 as in FIG. 2.

In operation, filter 22 is inserted into receiving space opening 46 and pushed against the ejector latch 50 until the filter 22 lies completely within the housing 12. In this position the filter 22 also depresses a micro switch 78, the operation of which will be described below. Filter 22 is secured within the housing 12 by closing door 48 which engages the door opening latch 52 with ejector button 54. Upon pressing the ejector button 54, the bottom portion of the ejector button 54 disengages from the door opening latch 52, door 48 opens, and cartridge filter 22 is ejected, such that a portion of the cartridge filter 22 extends beyond receiving space opening 46 to facilitate grasping the cartridge filter 22 for removal and replacement.

In operation, air is drawn into the air purifier unit 10, by blower 28, through the air intake opening 38 formed on a bottom surface of the housing 12. The air is pulled through cartridge filter 22 and blower frame 26, and exhausted out the air exhaust opening 44 formed in an upper side surface of the housing below the surface to which the unit is mounted.

The air purifier 10 of the present invention is particularly designed for mounting underneath kitchen cabinets, between cabinets, or the like. To mount the unit to these types of surfaces the air purifier 10 includes a mounting bracket 60, mountable to a bottom surface of a cabinet or a like surface.

The mounting bracket 60 includes a first cooperative coupling mechanism 64 and a second cooperative coupling mechanism 66, for removably mounting the air purifier 10 to a substantially flat surface.

The first cooperative coupling mechanism 64 includes at least two walls extending vertically from the surface of the mounting bracket 60, and at least two integrally formed tabs extending horizontally inward from the top of said walls, thereby defining a guided slot 68. First cooperative coupling mechanism 64 also includes locking spring posts 73, integral to the surface of the first cooperative coupling mechanism 64. The first cooperative coupling mechanism 64 is dimensioned to receive the second cooperative coupling mechanism 66.

Figure 8:
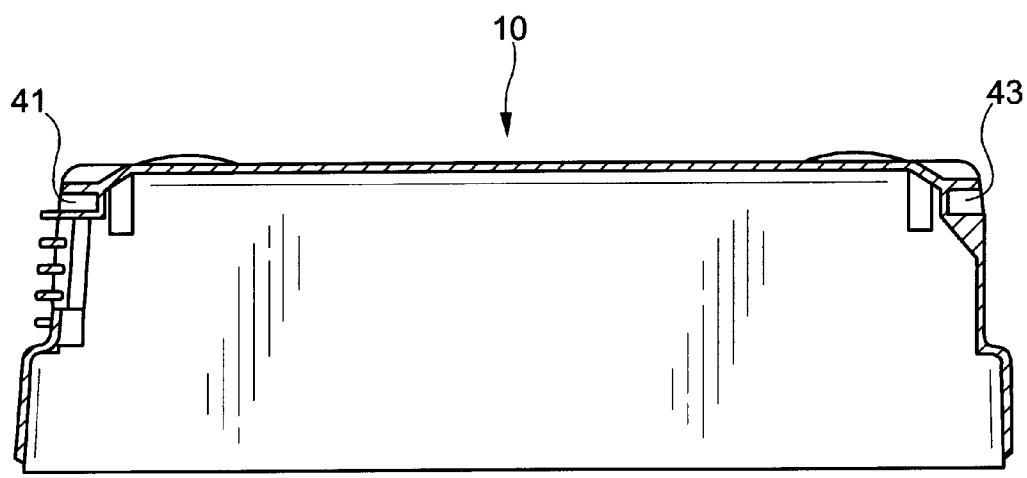
FIG. 8 is a front cross sectional view of the air purifier, including first and second mounting slots.

The first and second cooperative coupling mechanisms 64,66 also include integral mounting tabs 63,65, as shown in FIG. 7, which are generally L-shaped, each having a vertical wall portion extending downward towards the housing top cover 16, and a horizontal tab portion, extending horizontally inward such that mounting tabs 63, 65 engage mounting slots 41, 43, shown in FIG. 8, in housing top cover 16.

As shown in FIG. 7, second cooperative coupling mechanism 66 also includes at least one additional triangular shaped extension which extends vertically downward from the horizontal tab portion and is dimensioned to fit within a corresponding portion of the second mounting slot 62 in housing top cover 16. This triangular tab ensures that the mounting bracket 60 is properly aligned atop housing 12.

Second cooperative coupling mechanism 66, as illustrated in FIG. 2, further includes a releasable lock mechanism 70 having a locking spring 72, a releasable mounting latch 74, a mounting latch locking pin 77 and a mounting latch engagement slot 76. Second cooperative coupling mechanism 66 is secured within the guided slot 68 of the mounting bracket 60, by locking spring 72, which engages locking spring posts 73 in both the first and second cooperative coupling mechanisms 64,66 and pulls the second cooperative coupling mechanism 66 within the guided slot 68 against the first cooperative coupling mechanism 64. Locking spring 72 limits the distance the second cooperative coupling mechanism 66 may withdraw from the first cooperative coupling mechanism 64 to just enough to allow the mounting tabs 63, 65 to engage first and second mounting slots 41, 43 in housing top cover 16. Mounting latch 74 is pivotally mounted to a mounting post 75, the mounting post 75 being integrally attached to the bottom surface of the second mounting bracket 62. Mounting latch locking pin 77 is defined by an L-shaped extension of the second mounting bracket 62 which extends over the mounting latch 74 when the mounting latch 74 is in its most counterclockwise position. A protrusion on the underside of the extension cooperates with a corresponding indent in the mounting latch 74 and locks the air purifier to the bracket.

The entire air purifier 10 may be easily dismounted from the mounting bracket 60 and removed from its mounting position by simply pivoting mounting latch 74 in a clockwise direction, about mounting post 75. Clockwise rotation of mounting latch 74 disengages the mounting latch 74 from mounting latch engagement slot 76, allowing the user to slide the second cooperative coupling mechanism 66 far enough out of guided slot 68 to disengage mounting tabs 63, 65 from mounting slots 41, 43.

Housing top cover 16 also includes thereon a control knob 56 which allows the user to control the speed of the motor 24, and thereby, the fan blade 28 through a control circuit, described below. A control panel 32, is also mounted to the housing top cover 16. The control panel 32 includes, mounted thereon, a printed circuit board 34, which contains motor speed indicating circuitry 36.

Figure 4:
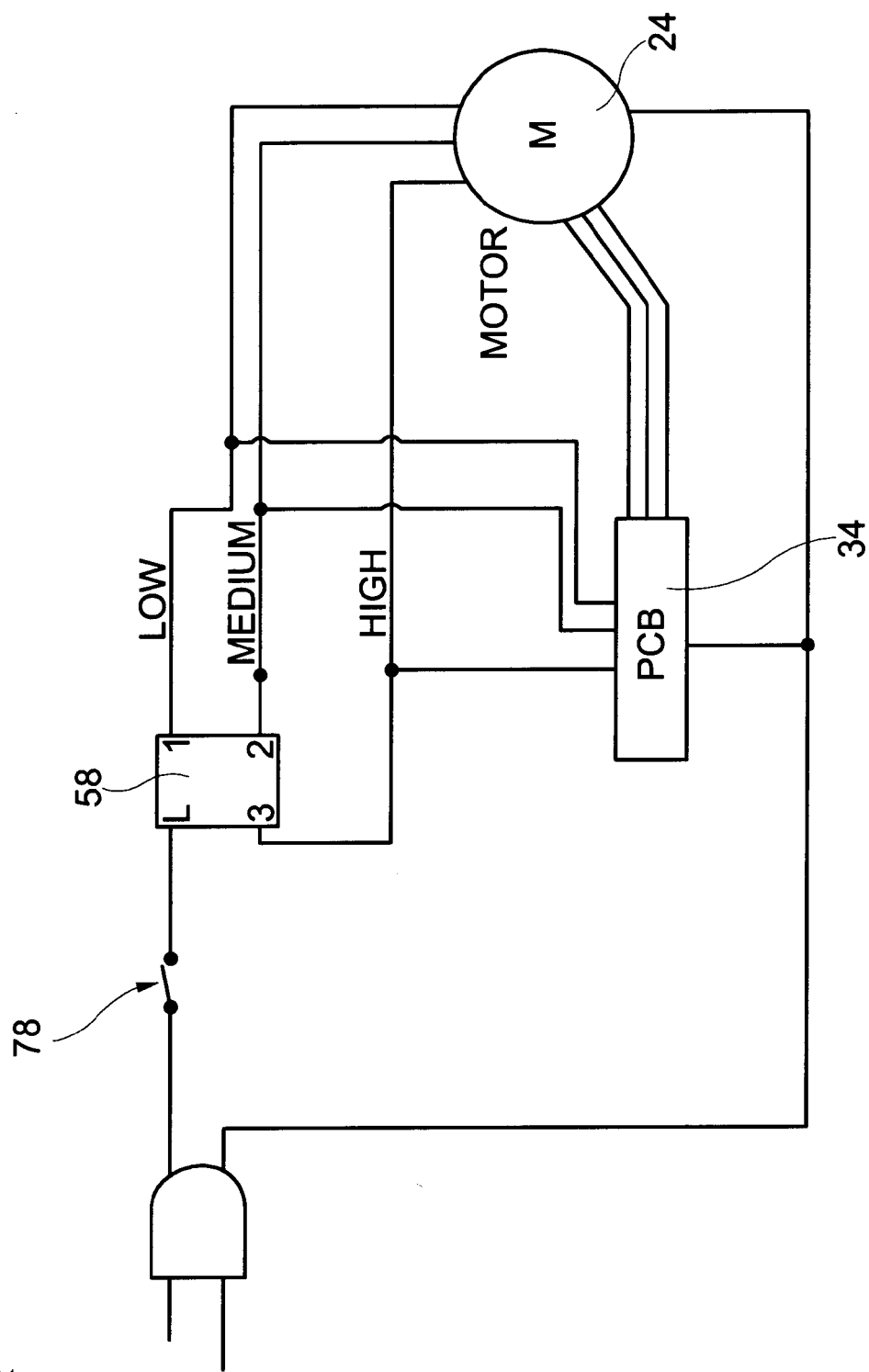
FIG. 4 is a schematic representation of the electrical control circuitry employed in the present invention.

Referring to FIG. 4, the electrical control circuit includes a micro switch 78; control switch 58; control knob 56 and a motor 24. Micro switch 78 is provided in series between the hot side of an AC source and the control switch 58. Physically located within the cartridge receiving space 42, the micro switch 78 acts as a cutoff switch in the normally open position. Insertion of the filter 22 into the cartridge receiving space 42 causes the filter 22 to depress the microswitch 78, close the switch and apply the AC source to the control circuit. Control switch 58 is selectively controlled by control knob 56 and includes three output terminals connected to the LO, MED and HI motor winding taps, respectively. Motor 24 is also coupled to the neutral side of the AC source. When micro switch 78 is closed, the AC source is applied across the LO, MED or HI windings of motor 24. Each output terminal of the control switch 58 is also connected to the input of the printed circuit board 34 which will be described in greater detail below. Three of the four printed circuit board output terminals are directly coupled to the LO, MED and HI motor windings. The fourth output terminal of the printed circuit board 34 is coupled directly to the neutral side of the AC source.

Figure 3:
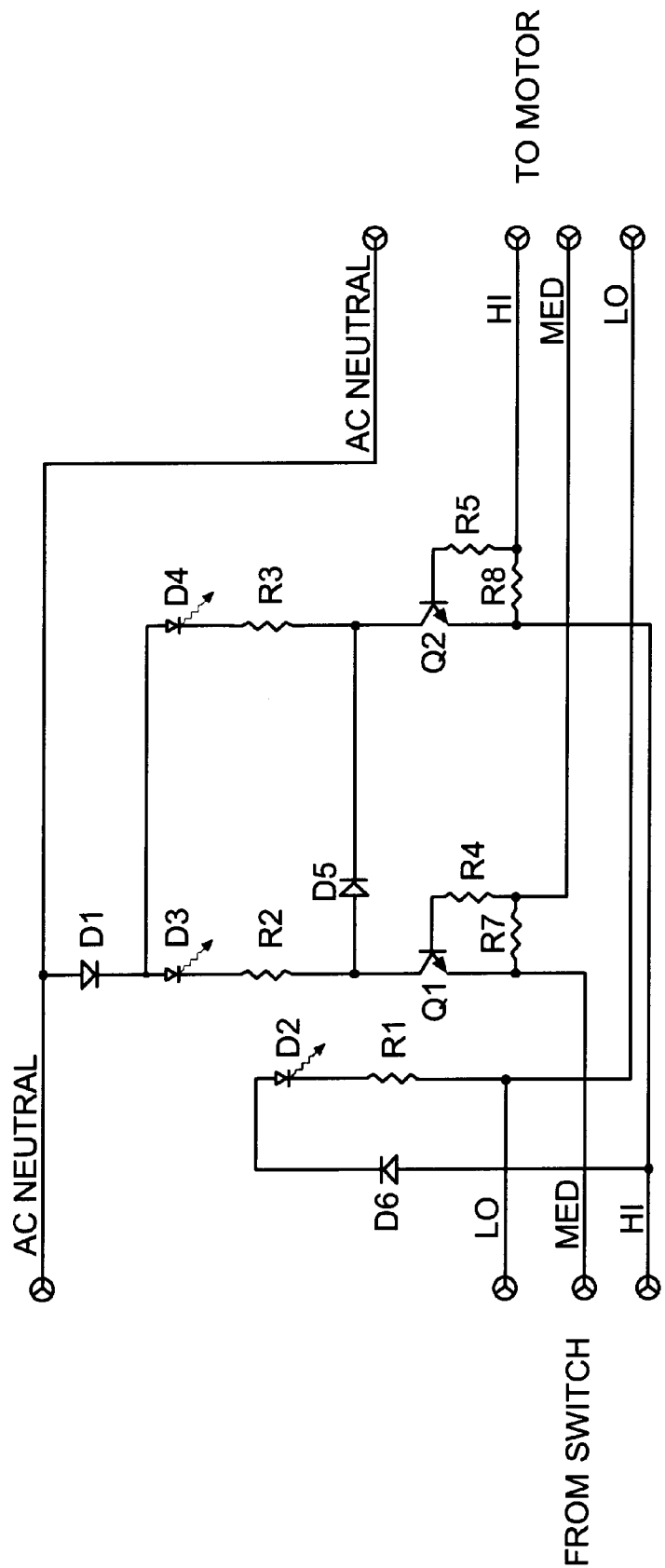
FIG. 3 is a schematic representation of the printed circuit board of the present invention.

Referring to FIG. 3, a schematic of the motor speed indicating circuitry 36 is illustrated. More specifically, three LEDs are used to indicate the speed of blower 24. In operation, when the control switch 58 is in the LO position, LED D2 illuminates. When control switch 58 is in the MED position, LEDs D2 and D3 illuminate. When the control switch 58 is in the HI position, LEDs D2, D3, and D4 illuminate. LEDs D2, D3 and D4 are combined in series, respectively, with resistors R1, R2, and R3. The series combination of D3 and R2 and of D4 and R3, respectively are in parallel with respect to each other and collectively in series with diode D1, the anode of each LED being connected to the cathode of diode D1. Diode D1 is also coupled directly to the AC Neutral. The series combination of LED D2 and resistor R1 is in series with diode D6 between the HI position of control switch 58 and the LO motor winding, which is also directly coupled to the LO position of control switch 58.

Resistor R2 is also coupled to the collector of transistor Q1. The collectors of Q1 and Q2 are coupled through Diode D5. Resistor R4 is in series with the base of transistor Q1 and the motor MED winding. Resistor R7 is connected in parallel with resistor R4, between the emitter of transistor Q1 and the motor MED winding.

Transistor Q2 is connected with its collector coupled to resistor R3 and its emitter coupled to resistor R8. Resistor R5 is connected between the base of transistor Q2 and the motor HI winding, in parallel with resistor R8. Resistor R8 is connected between the emitter of Q2 and the motor HI winding. The emitter of transistor Q2 is also coupled directly to the control switch 58 HI position.

In order to illuminate the LEDs for visual indication of blower speed, when control switch 58 is in the low position, current flows from the hot side of the AC power line input through the series combination of resistor R1 and LED D2, and through diode D6 during the negative half cycle of AC input power. The hot or energized lead of the AC line is also applied to the motor winding at motor LO, causing the motor 24 to run at low speed. Voltage is also present at motor MED and at motor HI. However, since control switch connections MED and HI are open in this position, there is insufficient potential voltage difference between the base and emitter of transistors Q2 and Q3, respectively, to turn them on. Therefore LEDs D3 and diode D4 remain off. Thus, a single illuminated LED indicates that the motor 24 is operating at low speed.

When the control switch 58 is in the MED position, the Hot side of the AC line is supplied through resistor R7 to the motor winding at MOTOR MED, causing the motor to run at medium speed. During the negative half cycle of input power, a sufficient potential difference develops across the base emitter junction of transistor Q1 to cause Q1 to turn on. Thus current flows through the series combination of resistor R2, and LED D3 to the neutral lead through diode D1, thereby illuminating diode D3. In addition, current flows through motor winding motor MED to the motor LO winding, thereby providing a path for current flow through resistor R1 and illuminating LED D2. Thus both LED D2 and LED D3 are illuminated when control switch 58 is in the MED position to visually indicate that the motor 24 is operating at medium speed. Similar to the situation in which the switch was in the LO position, the connection HI is open and there is insufficient potential voltage difference between the base and emitter of transistor Q3 to turn it on. Therefore LED D4 remains off.

When the control switch 58 is in the HI position the hot side of the AC line is supplied through resistor R8, at the emitter of transistor Q3, to the motor winding at motor HI causing the motor to run at high speed. During the negative half cycle of the input power a sufficient potential difference develops across the base emitter junction of transistor Q3 to cause the transistor to turn on. The collector of transistor Q3 is connected to the series combination of resistor R3 and LED D4. Turning on transistor Q3 causes current to flow through resistor R3, and LED D4 to the neutral lead through diode D1, thereby illuminating LED D4. Also, current flows from the collector of Q20, through Diode D5, R2 and LED D3, thereby illuminating LED D3. In addition, current flows through motor winding motor HI to motor LO, thereby providing a path for current flow through resistor R1 and illuminating LED D2. Thus, LEDs D2, D3 and D4 are illuminated when the control switch 58 is in the HI position providing a visual indication that the motor 24 is operating at high speed.

The LED motor speed indicator circuit 36 of the present invention is directly, electrically, linked to the winding taps of the motor 24 and does not rely upon sensing devices or the like to visually indicate motor speed. This particular design provides accurate motor speed indication with minimum electrical components to provide a cost effective unit.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope and spirit of the invention.

What is claimed is:

1. An air purifier comprising:

a housing having an air intake and an air exhaust opening;

a blower assembly including a fan blade connected to a motor positioned within the housing for drawing air into the housing through the intake opening and exhausting air out of the housing through the air exhaust opening:

a filter positioned within the housing such that air drawn into the housing passes through the filter before being exhausted out of the housing; and a mounting bracket attachable to a horizontal surface and including first and second cooperative coupling mechanisms for removably mounting the air purifier to the bracket, wherein the first and second cooperative coupling mechanisms are engaged with the housing by moving the second cooperative coupling mechanism relative to the first cooperative coupling mechanism to releasably engage corresponding mounting portions on the housing.

2. An air purifier as defined in claim 1, wherein the first cooperative coupling mechanism includes a guided slot dimensioned for receiving the second cooperative coupling mechanism therein.

3. An air purifier as defined in claim 1, wherein the second cooperative coupling mechanism further includes a releasable lock mechanism for securing the second cooperative coupling mechanism within the guided slot of the first cooperative coupling mechanism.

4. An air purifier as defined in claim 3, wherein the releasable lock mechanism comprises a releasable mounting latch within the second cooperative coupling mechanism which cooperates with a mounting latch engagement slot in the first cooperative coupling mechanism.

5. An air purifier as defined in claim 1, further including a motor speed indicator circuit for use with a motor having at least two winding taps, the motor speed indicator circuit comprising:

a motor control switch having at least a first and second position for operating the motor at a first low speed and a second higher speed, respectively; and at least two motor speed indicators electrically coupled to the at least two winding taps, respectively, and the motor control operating switch, wherein the motor speed indicators are activated in response to feedback current flowing through the motor windings.

6. An air purifier comprising:

a housing having an air intake and an air exhaust opening;

a blower assembly including a fan blade connected to a motor positioned within the housing for drawing air into the housing through the intake opening and exhausting air out of the housing through the air exhaust opening, and a filter provided in the form of a filter cartridge positioned within the housing such that air drawn into the housing passes through the filter before being exhausted; the housing including a filter receiving space for removably receiving the filter cartridge and a filter ejection mechanism for ejecting the filter cartridge from within the receiving space of the housing.

7. An air purifier as defined in claim 6, wherein the filter cartridge includes a frame there around to form a filter cartridge dimensioned to fit within the filter receiving space and to cooperate with the filter ejection mechanism.

8. An air purifier as defined in claim 6, wherein the filter ejection mechanism comprises a spring loaded ejector latch mounted within the filter receiving space and cooperatively coupled to an ejector button positioned on an outer surface of the housing.

9. An air purifier as defined in claim 6, wherein the filter receiving space includes an opening through the housing for removably receiving the filter and the housing further includes a door selectively enclosing the filter receiving space opening.

10. An air purifier comprising:

a housing having an air intake and an air exhaust opening;

a blower assembly including a fan blade connected to a motor positioned within the housing for drawing air into the housing through the intake opening and exhausting air out of the housing through the air exhaust opening;

a filter positioned within the housing such that air drawn into the housing passes through the filter before being exhausted;

the housing including a filter receiving space for removably receiving the filter wherein said filter receiving space includes an opening through the housing for removably receiving the filter and the housing further includes a door selectively enclosing a filter receiving space opening; and a filter ejection mechanism comprises a spring loaded ejector latch and door opening latch cooperatively coupled to an ejector button positioned on an outer surface of the housing such that upon pressing the ejector button the door opens and the filter is ejected so that a portion of the filter extends beyond the receiving space opening to facilitate grasping the filter for replacement.

11. An air purifier comprising:

a housing having an air intake and an air exhaust opening;

a blower assembly including a fan blade connected to a motor positioned within the housing for drawing air into the housing through the intake opening and exhausting air out of the housing through the air exhaust opening, a filter positioned within the housing such that air drawn into the housing passes through the filter before being exhausted; the housing including a filter receiving space for removably receiving the filter and a filter ejection mechanism for ejecting the filter cartridge from within the receiving space of the housing, and a motor speed indicator circuit for use with a motor having at least two winding taps, the motor speed indicator circuit comprising:

a motor control switch having at least a first and second position for operating the motor at a first low speed and a second higher speed, respectively; and at least two motor speed indicators electrically coupled to the at least two winding taps, respectively, and the motor control operating switch, wherein the motor speed indicators are activated in response to feedback current flowing through the motor windings.

12. An air purifier comprising:

a housing having an air intake and an air exhaust opening;

a blower assembly including a fan blade connected to a motor positioned within the housing for drawing air into the housing through an intake opening and exhausting air out of a housing through the air exhaust opening;

a filter positioned within the housing such that air drawn into the housing passes through the filter before being exhausted; the housing including a filter receiving space for removably receiving the filter and a filter ejection mechanism for ejecting the filter cartridge from within the receiving space of the housing;

a motor speed control switch having at least a first and second position for operating the motor at a first low speed and a second higher speed, respectively; and a motor speed indicating circuit wherein at least two motor speed indicators indicate the speed of the motor, the motor including at least two winding taps thereon, the motor speed indicators being electrically coupled to the at least two winding taps, respectively, and the motor control operating switch, wherein the motor speed indicators are activated in response to feedback current flowing through the motor windings.

13. An air purifier, as defined in claim 10, further including a microswitch, the microswitch being mounted within the housing such that insertion of the filter into the housing depresses the microswitch, so that electrical current is supplied to the motor speed control switch.

14. An air purifier, as defined in claim 10, wherein the motor speed indicator circuit associated with the first low speed is directly electrically coupled to an input current through the motor control switch in the first position.

15. An air purifier, as defined in claim 10, wherein the feedback current turns on a transistor device to activate the motor speed indicators when the control switch is in the second position.

16. An air purifier, as defined in claim 10, wherein the motor speed indicators comprise light emitting diodes.

17. An air purifier, as defined in claim 10, wherein the feedback current turns on the transistor device directly electrically coupled to the second position of the control switch and activates the motor speed indicator directly electrically coupled to that transistor and wherein the feedback current also flows through the winding directly electrically coupled to the first control switch position and activates the motor speed indicator directly electrically coupled to the first control switch position.

18. A motor speed indicator circuit for use with a motor having at least two winding taps, comprising:
   a motor control switch having at least a first and second position for operating the motor at a first low speed and a second higher speed, respectively; and
   at least two motor speed indicators that are directly electrically coupled to the at least two winding taps, respectively, and the motor control operating switch, wherein the motor speed indicators are activated in response to a feedback current flowing through the motor windings, said at least two motor speed indicators including a light emitting diode connected in series with a resistor to sense current flow.

19. A motor speed indicator circuit as defined in claim 18, wherein the motor speed indicator associated with the first low speed is directly electrically coupled to an input current through the motor control switch in the first position.

20. A motor speed indicator circuit as defined in claim 18, wherein the feedback current turns on a transistor device to activate the motor speed indicators when the control switch is in the second position.

21. A motor speed indicator circuit as defined in claim 19, wherein the feedback current turns on the transistor device directly electrically coupled to the second position of the control switch and activates the motor speed indicator directly electrically coupled to that transistor and wherein the feedback current also flows through the winding directly electrically coupled to the first control switch position and activates the motor speed indicator directly electrically coupled to the first control switch position.

* * * * *